United States Patent [19]

Chang

[11] 4,047,936
[45] Sept. 13, 1977

[54] PROCESS FOR REFINING HOT METAL TO STEEL

[75] Inventor: Yi-Chung Chang, Murrysville, Pa.

[73] Assignee: Berry Metal Company, Harmony, Pa.

[21] Appl. No.: 599,197

[22] Filed: July 25, 1975

Related U.S. Application Data

[62] Division of Ser. No. 347,743, April 4, 1973, Pat. No. 3,912,243.

[51] Int. Cl.² .......................... C21C 5/32; C21C 5/30
[52] U.S. Cl. ............................................ 75/52; 75/60
[58] Field of Search .......................... 75/51, 52, 59, 60

[56] References Cited

U.S. PATENT DOCUMENTS

| | | | |
|---|---|---|---|
| 2,562,813 | 7/1951 | Ogorzaly | 75/60 |
| 2,962,277 | 11/1960 | Morrill | 75/60 |
| 3,839,017 | 10/1974 | Schempp | 75/52 |

Primary Examiner—P. D. Rosenberg
Attorney, Agent, or Firm—Richard J. Myers

[57] ABSTRACT

An apparatus for refining hot metal to steel including a converter provided in the bottom thereof with imbedded concentric double-tube injectors for introducing oxygen enveloped by a shielding gas into the interior of the steel bath to oxidize impurities, and also including in the upper side wall thereof, water-cooled lance-burners for injecting oxygen and fuel into the freeboard space (area above the bath) of the converter to burn the combustibles of the bath gas. The coolant means for the said lance-burners may be introduced through the trunnions of the converter and piped by a distribution system to each of the lances. Alternatively, an overhead water-cooled lance may be used to enter the vessel in the vertical position through the mouth opening. Also, the overhead lance may have a curved shape and attached to a rotary arm which in turn is supported by a sliding column with the lance entering the converter through a hole in the hood by rotating the arm clockwise and leaving the converter by rotating the arm counterclockwise, the height of the lance being adjustable to vertical reciprocable movement of the sliding column. The invention also discloses a process of injecting either oxygen or oxygen and fuel to the space above the molten bath of the bottom-blow converter to generate additional heat to aid the steel refining operation, particularly to melt more scrap. The scrap can either be preheated before charging the hot metal or be melted together with hot metal without preheating.

4 Claims, 11 Drawing Figures

CHARGING AND PREHEATING SCRAP

BLOWING OXYGEN

CHARGING HOT METAL

POURING MELT

PROCESS FOR REFINING HOT METAL TO STEEL

This is a division of Ser. No. 347,743, filed Apr. 4, 1973 now U.S. Pat. No. 3,912,243.

BACKGROUND OF THE INVENTION

1. Field of the Invention

This invention relates to an apparatus and a process for refining of hot metal and scrap iron to steel in a bottom-blow steel-making converter.

2. Description of the Prior Art

It is well known that the method of refining the pig iron and/or scrap iron consists of blowing the primary stream of oxygen from the bottom of a steel-making converter. The converter can be of the conventional Thomas type with either conventional oxygen tuyeres or concentric tube gas-shield oxygen injectors. It is, however, desirable to melt larger and larger amounts of steel and also desirable to melt larger amounts of scrap per ton of steel melted. It, also, is desirable to shape the slag formed in the process more rapidly and hence improve efficient removal of sulphur and phosphorus from the molten bath. Further, it is desirable to reduce the amount of fumes and ejections from the bath and hence have a cleaner operation. Also, it is desirable to have a better control of the bath temperature thus reducing the number of heats of molten metal for reblow. It is, therefore, obvious that an improved bottom-blow type of furnace is desirable and this is what the instant invention accomplishes.

SUMMARY OF THE INVENTION

This invention has for its principal purpose the developing of apparatus and the using of a process for melting larger heats of steel and also, where required, greater quantities of scrap steel in order to reduce cost. In order to do this, the method consists not only in blowing primary oxygen streams from the bottom of the furnace but also injecting secondary oxygen streams above the bath. The primary oxygen reacts chemically with the steel bath to oxidize the undesired impurities and generates a gaseous product rich in combustibles including carbon monoxide and hydrogen gasses and hydrocarbons. The secondary oxygen stream injected overhead causes burning of the combustibles of the bath gas in the converter above the steel bath. The heat of combustion so generated is efficiently utilized to aid the refining operation. During certain stages of the refining cycle, when the amount of combustibles above the bath is small, a fuel, either gas or oil, can be supplied overhead simultaneously with the secondary oxygen for the generation of heat above the steel bath by the novel inventive process and apparatus described below.

The apparatus to accomplish this is the water-cooled overhead lance which is used in cooperation with the bottom-installed oxygen injectors. The lance may be either of the type for injecting oxygen alone or of the burner type for injecting both oxygen and a fuel. The lance may be installed in the side wall of the nose-cone region of the converter and thus becomes an integral part of the converter and moves with the converter through all its movement and position or as a separate entity installed above the converter and enters the converter through its mouth opening only in its vertical position. Further, the converter may either employ the conventional Thomas tuyeres for injecting the primary oxygen gas in diluted form from the bottom of the furnace or employ concentric double-like injectors for injecting pure oxygen enveloped in a shield gas of steam, inert gases, hydrocarbons, or liquid fuels.

Generation of heat above the bath by burning either the combustibles produced by the refining reactions and/or fuels supplied externally from the top, has the advantages of melting more than the normal amount of scrap per ton of steel, accelerating the shaping of the slag and thus quicker and efficient removal of sulphur and phosphorus, reducing the amount of fume and ejections from the bath and, therefore, less pollutants to the air and greater metallic yield, and offering a better control of the bath temperature and, therefore, reducing the number of heats for reblow, being better able to control the oxygen content of the slag and the steel and, therefore, better deoxidation practice and less iron oxide in the slag, being able to shorten the heat time and hence, higher production.

It is a further object of this invention to provide processes for the apparatus disclosed herein where the scrap may or may not be preheated before the charging of the hot metal to converter bath.

These and other advantages, objects and purposes of the invention will become more readily apparent from reference to the following description, attached drawings and appended claims.

DESCRIPTION OF THE PREFERRED EMBODIMENT

Figure 1:
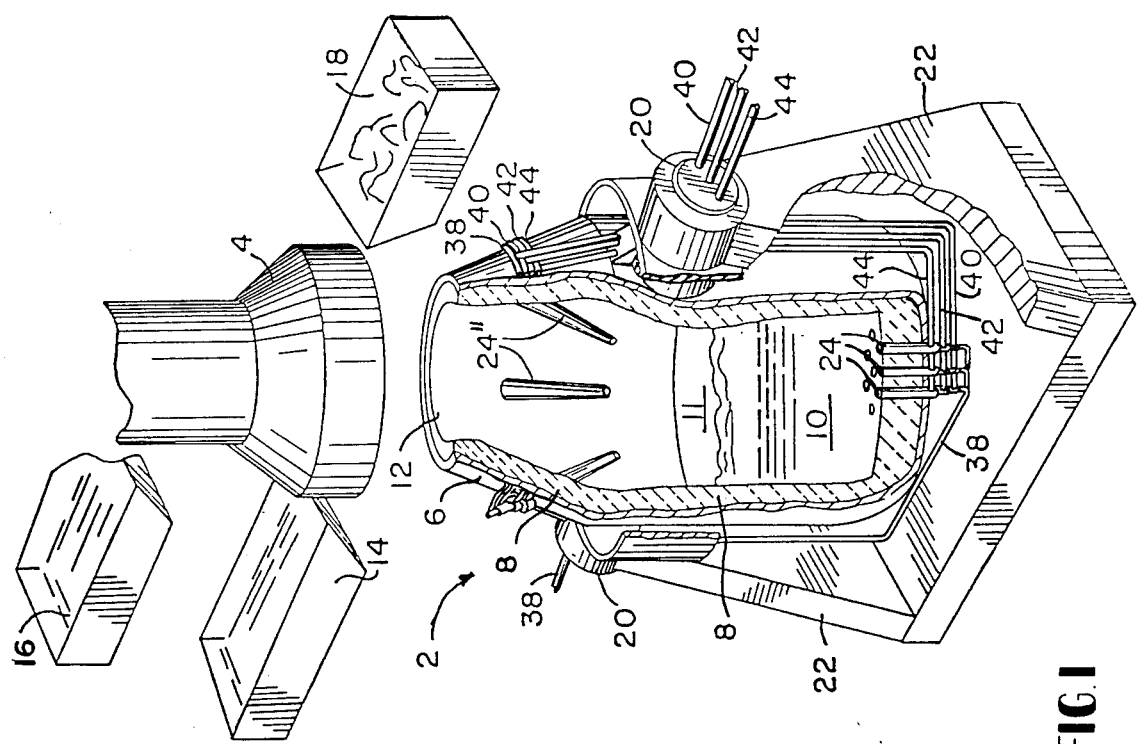
FIG. 1 is an elevational view, partially in section, of the bottom-blow converter lance-burners mounted in the upper side walls.
Figure 2:
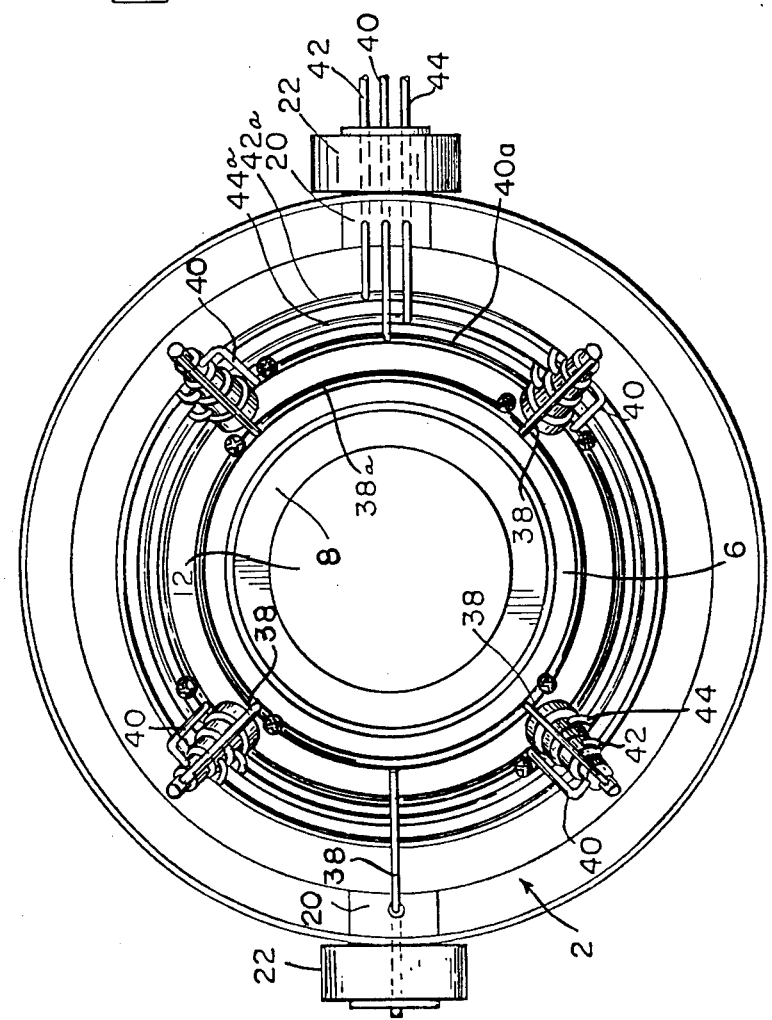
FIG. 2 is a top plan view of the converter with lance-burners shown in FIG. 1.

With reference now to the drawings and in particular with reference to FIGS. 1-2, there is shown a converter 2 of the bottom-blow type for making of steel by oxygen blowing. The converter 2 is provided with a hood 4 above said converter for receiving waste gasses from mouth opening 12. The converter 2 is provided with an outer metal shell 6 and inner refractory lining 8 in which is disposed a molten bath of steel 10 and upon which floats the slag 11. Imbedded in the bottom of the converter are the oxygen injectors 24 which are conventional and are not water-cooled for injecting the oxygen intended for refining. In the wall of the nose-cone are oxy-fuel lance-burners 24" for injecting oxygen and fuel to generate additional heat above the bath. The injectors 24 in the bottom of the tank may optionally have the oxygen gas surrounded by a shield gas, such as methane. Schematically there is shown a ladle of hot metal 14 (molten pig iron) above the converter as well as a container 16 of flux and a container 18 of scrap, all of which may be added through the top opening 12 with the converter in a tilted position. The converter 2 is provided with trunnions 20 pivotally mounting the same on the pedestal 22.

Figure 3:
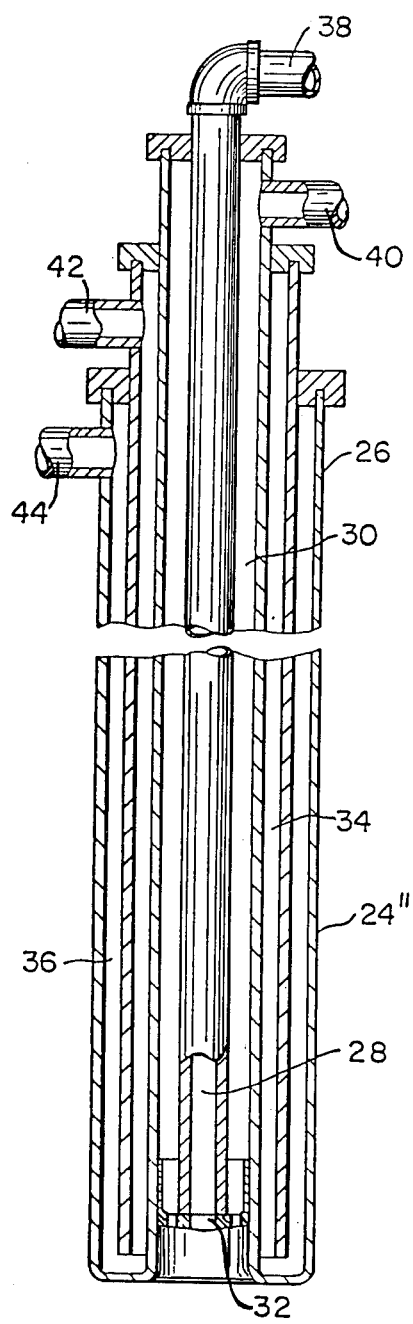
FIG. 3 is illustrative of the oxy-fuel lance-burner with water cooling.
Figure 4:
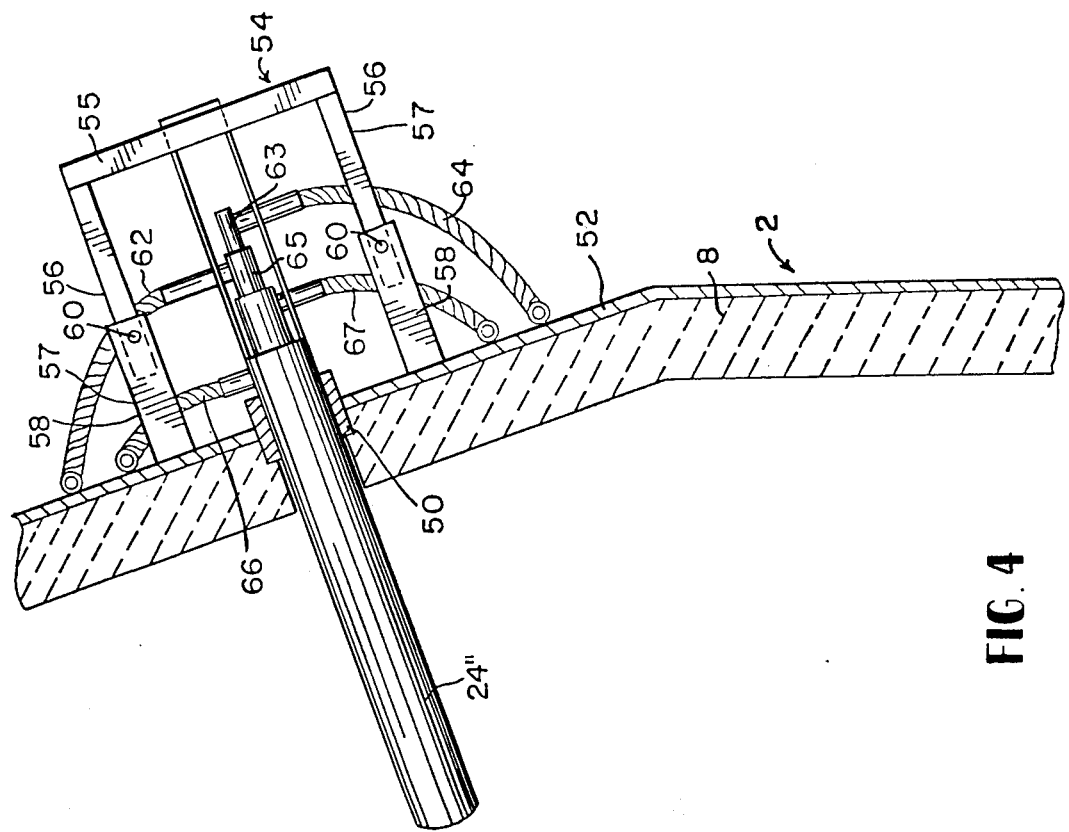
FIG. 4 is illustrative of a mounting apparatus for locating any oxy-fuel lance-burner in the top wall of the converter.

FIG. 3 shows the oxy-fuel lance-burner 24" composed of a burner body 26 having an inner passage 28 which conducts the fuel gas and an outer passage 30 which conducts the oxygen gas. The lance-burner 24" is further provided with a gas mixing head 32, a water inlet conduit 34 and a water exit conduit 36 for cooling of the lance-burner. Fuel inlet line 38 supplies fuel to the fuel conduit and oxygen inlet line 40 supplies oxygen to the oxygen conduit and water inlet line 42 supplies water or coolant to the water inlet conduit 34 and the water outlet line 44 receives water or coolant from the water exit conduit 36. The lance-burner 24" is installed in the upper side wall of the converter as shown in FIG. 4 where the lance-burner may be adjustable inwardly and out of the converter. The burner 24" of FIG. 4 is reciprocably disposed within the cooler guide 50 mounted on the side slope portion 52 of the converter wall and is held by the adjustable supporting frame 54 which includes a top horizontally extending member 55 attached to the top end of the lance-burner 24". The frame 54 further includes upper telescoping members 56 which move relative to the lower telescoping members 58 but may be fixed against movement by the adjusting screw means 60. Flexible hosing is used to conduct the fuel and oxygen to the lance-burner 24", and to introduce the water coolant thereto. For this purpose a flexible fuel hose 64 is provided for introducing fuel into the fuel chamber 63 and a flexible oxygen hose 62 is provided for introducing oxygen into the fuel chamber 65 and flexible water line 67 is provided to introduce coolant into the lance-burner 24" and flexible water line 66 is utilized to exit water from the lance-burner 24".

FIG. 2 shows a distribution or piping arrangement for the top side installed lance-burners 24" including a fuel distributor circular line 38a, an oxygen distributor circular line 40a, a water or coolant inlet circular distributor line 42a and a water outlet distributor circular line 44a.

The secondary oxygen stream introduced into the space above the bath for burning enters from the trunnions and is piped to the lances through the distributor system. Similarly, when an external fuel is employed, it is entered from the trunnions and distributed to the lances through the distributor system. Control valves for both the oxygen flow and the fuel flow are also utilized. When the lances are water-cooled, cooling water can be entered and exited through the trunnions and piped to the individual lances as shown in FIGS. 1 and 2.

Figure 5:
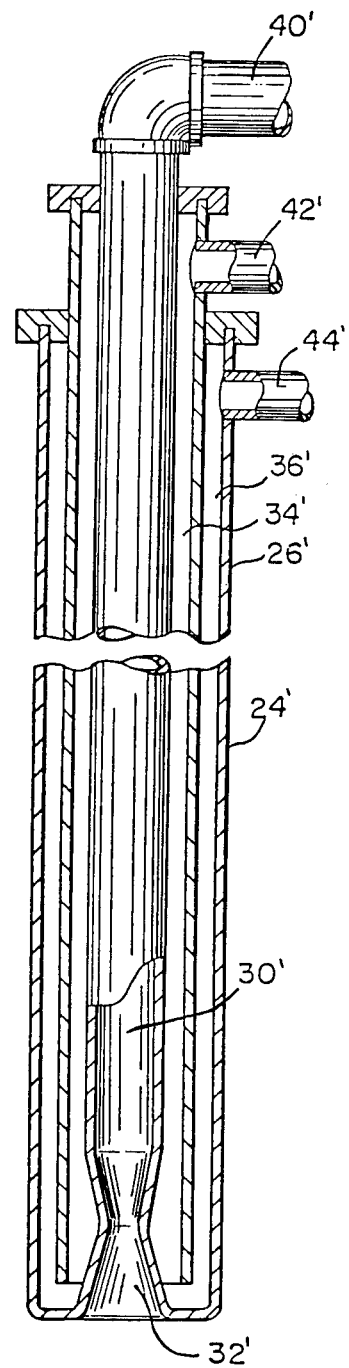
FIG. 5 is illustrative of an overhead water-cooled oxygen lance.

FIG. 5 illustrates the oxygen lance 24' which may be used in the top of the furnace for the introduction of oxygen to burn the combustible gases from the refining reactions. The lance 24' includes a lance both 26'. The lance body is provided with an oxygen passage 30' and a converging/diverging nozzle portion 32', a water inlet passage 34', a water outlet passage 36', an oxygen inlet line 40', a water inlet line 42' and a water outlet line 44'.

Figure 6:
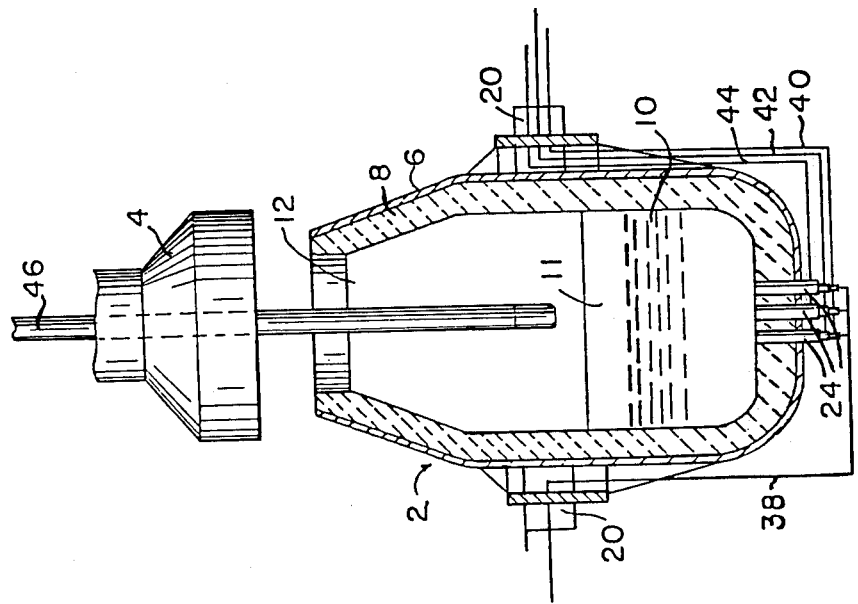
FIG. 6 is an elevational view of the converter illustrating the use of an overhead oxygen lance extending into the converter through the mouth opening thereof.

FIG. 6 is illustrative of the introduction of an overhead lance 46 of the type shown in FIG. 5 through the overhead hood 4 and into the top of the converter 2 but above its molten bath 10 and slag 11.

Figure 7:
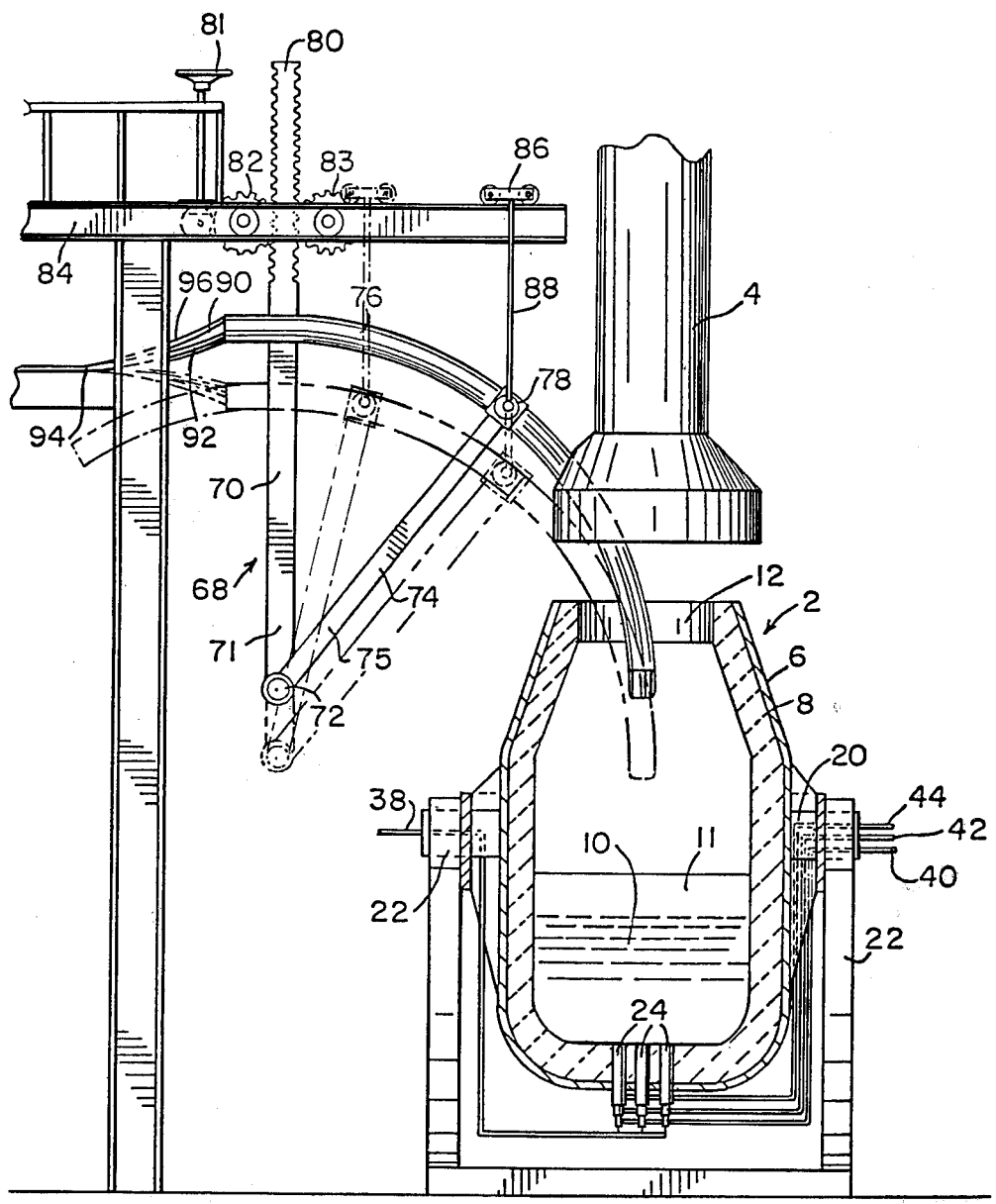
FIG. 7 is an elevational view of a steel-making converter with a modified curved overhead rotary lance.

Another alternate arrangement of a lance with respect to the converter is shown in FIG. 7 where a curved overhead lance structure 68 is featured. The lance structure 68 provides that a lance 76 may be moved vertically and rotationally as illustrated by the phantom lines in that drawing. The lance structure includes an upright sliding column 70 which is provided with a lower end 71 pivotally connected at the pivot 72 to the pivot end 75 of the diagonal rotary arm 74 which moves about the pivot 72. The diagonal arm rotary 74 carries the curved lance 76 about the pivot 72 which is provided with an adjustable rope length unit or rope slack adjuster 78 connected to the rope 88 carried on the movable hanger 86 on the support structure 84. The support structure 84 carries pinion gears 82 and 83 driven by handle drive member 81 for raising and lowering the upper tooth end 80 of the sliding column 70. The lance is further provided with gas inlet 90, oxygen inlet 92, water inlet 94 and water outlet 96. The lance enters the converter through the opening 12 by rotating the diagonal rotary arm 74 clockwise and leaves the converter by rotating the arm 74 counterclockwise, the height of the lance being adjustable through the sliding column. A distinct advantage of the rotary curved lance is that the converter does not require a tall building for housing and thus represents considerable savings in the investment cost of the converter. This type of rotary curved lance can also be adapted to a top-blow basic oxygen furnace shop and, therefore, is an advantage for converting an existing open hearth shop to a top-blow basic oxygen furnace shop.

With the complement of apparatus described previously, the process of this invention may be explained as follows:

The primary oxygen gas is introduced into the bottom of the furnace and is surrounded by a shield gas and this primary oxygen reacts chemically with the steel bath of oxidize the undesired impurities and generates a gaseous product rich in combustibles including carbon monoxide, hydrogen gas and hydrocarbons. This gaseous product is collected above the bath and normally goes into the hood, is cooled, cleaned and either recovered as a fuel or vented to the air, but by the method of this invention, the combustibles of the furnace gas are burned right in the converter above the steel bath with the necessary oxygen stream injected from the top. The heat of combustion generated above the steel bath is efficiently utilized to aid the refining operation. During certain stages of the refining cycle, when the amount of combustibles is small, a fuel either gas of oil, can be supplied from the top simultaneously with the necessary oxygen for the generation of heat above the steel bath.

The main purpose of injecting either oxygen or oxygen and fuel from the top of the bottom-blow converter 2 is to generate additional heat to aid the refining operation, particularly to melt more scrap. The scrap can either be preheated before charging the hot metal or be melted together with the hot metal. The operational sequences with and without preheating the scrap of the instant invention are described as follows:

OPERATIONAL SEQUENCE NO. 1 (PREHEATED SCRAP)

Figure 8:
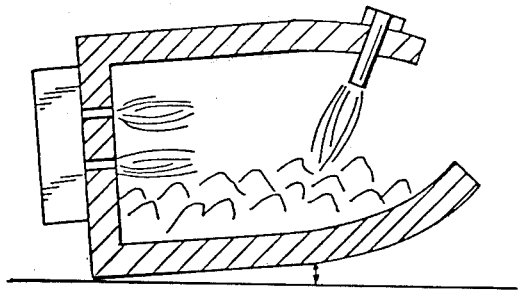
FIGS. 8-11 are schematic diagrams illustrating converter operation.
Figure 10:
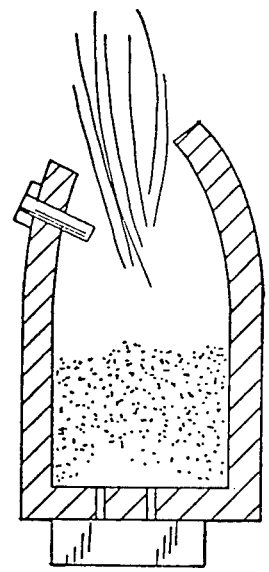
Figure 9:
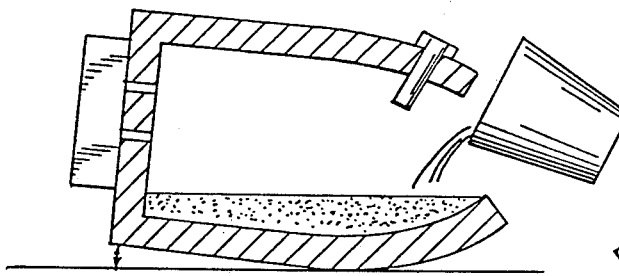
Figure 11:
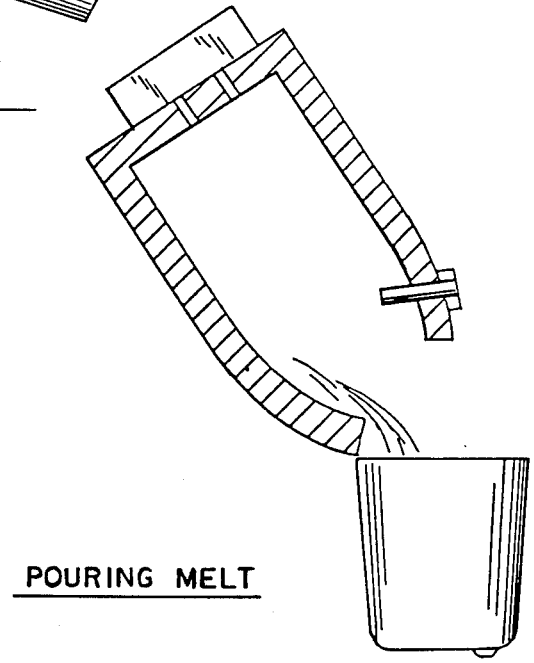

1. Referring to FIG. 8, turn converter to position A (charging and preheating scrap position).
2. Charge scrap into the converter.
3. Preheat the scrap to a temperature in the range of 600° to 1400° F, by:

a. Using the bottom injectors as burners by adjusting the oxygen to fuel gas ratio to a nearly neutral flame.
b. Using the overhead lance-burners installed in the wall of the nose-cone of the converter by adjusting the oxygen/fuel ratio to a nearly neutral flame.
4. Referring to FIG. 8, at the end of the preheating operation, turn the converter to position B (charging hot metal position).
5. Charge the hot metal into the converter.
6. Charge a part of the fluxes into the converter.
7. Do the following operations almost simultaneously:
   a. Use the bottom injecytors for blowing the prime oxygen intended for refining the steel by adjusting the oxy/fuel gas ratio.
   b. Turn the converter from position B to position C. (See FIG. 10)
   c. Continue using the overhead lance-burners for heating the bath by adjusting the angle of the lance-burners so that the flames are directed toward the bath.
8. With the converter in position C (See FIG. 10) do the following:
   a. Continue bottom-blowing of primary oxygen for refining the bath.
   b. Powdered fluxes may be injected into the bottom oxygen stream for desulphurization and dephosphorization of the steel if so equipped.
   c. Add the remainder of the fluxes from the top if bottom-injection is not available.
   d. Continue generating additional heat over the bath by adjusting the oxygen/fuel ratio of the overhead lance-burners in accordance with the amount of combustibles present in the gases of the refining reactions.
9. At end of the refining period, check the carbon content and temperature of the steel and if necessary:
   a. Adjusting the carbon by bottom-blowing.
   b. Adjusting the temperature by heating with the overhead lance-burner.
10. Turn the converter from position C to position D (see FIG. 11) and discharge the steel and slag. When a separate overhead lance-burner is used, it is lowered into the converter after the converter is turned to the position C and is withdrawn from the converter at the end of the refining period before turning the converter to position D. It is used to generate additional heat above the bath only during the refining period.

OPERATIONAL SEQUENCE NO. 2 (WITHOUT PREHEATING SCRAP)

1. Referring to FIG. 8, turn converter to position A.
2. Charge scrap into the converter.
3. Turn the converter from position A to position B.
4. Charge the hot metal.
5. Charge a part of fluxes.
6. Do the following operations almost simultaneously:
   a. Inject the primary oxygen by means of the bottom injectors.
   b. Turn the converter from position B to position C.
   c. Use of overhead lance-burners located in the wall of the nose-cone of the converter to heat the bath by adjusting the oxygen to fuel ratio in accordance with the amount of combustibles in the gaseous products of the refining reactions.
7. With the converter in position C (see FIG. 10) do the following:
   a. Continue bottom-blowing primary oxygen for refining the bath.
   b. Powdered fluxes may be injected into the bottom oxygen stream for desulphurization and dephosphorization of the steel if so equipped.
   c. Add the remainder of the fluxes from the top if bottom-injection is not available.
   d. Continue generating additional heat over the bath by adjusting the oxygen/fuel ratio of the overhead lance-burners in accordance with the amount of combustibles present in the gases of the refining reactions.
8. At end of the refining period, check the carbon content and temperature of the steel and if necessary:
   a. Adjusting the carbon by bottom-blowing.
   b. Adjusting the temperature by heating with the overhead lance-burner.
9. Turn the converter from position C to position D (see FIG. 11) and discharge the steel and slag.
   When a separate overhead lance-burner is used, it is lowered into the converter after the converter is turned to the position C and is withdrawn from the converter at the end of the refining period before turning the coverter to position D. It is used to generate additional heat above the bath only during the refining period.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. The process of making steel in a bottom-blow converter which is provided in the top thereof with a burner lance supplying oxygen for heat of combustion in the top at the converter whereby the converter may be charged with pig iron and scrap, the steps of the process comprising:
   1. charging of scrap through the top of the converter,
   2. bottom blowing of oxygen with a shield gas over said scrap thereby oxidizing impurities in the vessel generating a combustible gaseous product,
   3. simultaneously top blowing with said burner lance of oxygen into said converter for burning with said combustible gases for producing heating of said scrap to molten metal,
   4. charging said molten metal with pig iron supplied to said converter,
   5. continuing the bottom and top blowing of oxygen with the said blowing decarbonizing said molten bath,
   6. charging of lime and other fluxes into said converter, said bottom blowing of said oxygen and top blowing combining with said combustible gases for producing heat at the top of the molten bath, and
   7. discharging steel and slag from said converter.

2. The invention in accordance with claim 1, said process further including the use of fuel with the oxygen during blowing for heating the molten bath.

3. The invention in accordance with claim 1, said scrap being preheated to a temperature in the range of 600° to 1400° F.

4. The invention in accordance with claim 3 wherein said top burner lance is blowing fuel simultaneously with oxygen.

* * * * *